(12) United States Patent
Palmieri

(10) Patent No.: US 6,993,716 B2
(45) Date of Patent: Jan. 31, 2006

(54) FRAME REARRANGEMENT TO SUPPORT BIDIRECTIONAL LANGUAGES IN A WEB APPLICATION

(75) Inventor: David W. Palmieri, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 471 days.

(21) Appl. No.: 10/252,082

(22) Filed: Sep. 20, 2002

(65) Prior Publication Data

US 2004/0059998 A1    Mar. 25, 2004

(51) Int. Cl.
*G06F 15/00*    (2006.01)

(52) U.S. Cl. .................... 715/517; 715/501.1
(58) Field of Classification Search ............ 715/501.1, 715/513, 517, 509
See application file for complete search history.

(56) References Cited

U.S. PATENT DOCUMENTS

| | | | | |
|---|---|---|---|---|
| 5,090,413 | A | 2/1992 | Yoshioka | 128/660.07 |
| 5,381,523 | A * | 1/1995 | Hayashi | 715/513 |
| 5,515,481 | A | 5/1996 | Pardo | 395/117 |
| 5,537,528 | A | 7/1996 | Takahashi et al. | 395/154 |
| 5,551,055 | A | 8/1996 | Matheny et al. | 395/882 |
| 5,675,752 | A | 10/1997 | Scott et al. | 395/333 |
| 5,974,372 | A * | 10/1999 | Barnes et al. | 704/8 |
| 6,222,532 | B1 | 4/2001 | Ceccarelli | 345/328 |
| 6,353,700 | B1 * | 3/2002 | Zhou | 386/68 |
| 6,421,740 | B1 * | 7/2002 | LeCroy | 719/331 |
| 6,647,410 | B1 * | 11/2003 | Scimone et al. | 709/206 |
| 6,711,714 | B1 * | 3/2004 | Wynblatt et al. | 715/500.1 |
| 6,769,096 | B1 * | 7/2004 | Kuppusamy et al. | 715/530 |
| 2001/0054049 | A1 * | 12/2001 | Maeda et al. | 707/517 |
| 2002/0013165 | A1 * | 1/2002 | Ostergaard | 455/566 |
| 2002/0097270 | A1 * | 7/2002 | Keely et al. | 345/764 |
| 2002/0184337 | A1 * | 12/2002 | Hyldahl | 709/218 |
| 2003/0061022 | A1 * | 3/2003 | Reinders | 704/2 |
| 2004/0039996 | A1 * | 2/2004 | Flam | 715/536 |
| 2005/0010865 | A1 * | 1/2005 | Kuppusamy et al. | 715/512 |

FOREIGN PATENT DOCUMENTS

GB    2361858    10/2001

OTHER PUBLICATIONS

PR Newswire, Inso Release Outside In (R) Viewer Technology Version 6.0 Now Available on Linux, ProQuest Dec. 20, 1999, p. 1.*

(Continued)

*Primary Examiner*—Cong-Lac Huynh
(74) *Attorney, Agent, or Firm*—Gerald M. Woods, Esq.; Steven M. Greenberg, Esq.; Christopher & Weisberg, P.A.

(57) ABSTRACT

A bidirectional frame processing system, method and apparatus. In accordance with the inventive arrangements, a preferred directional orientation can be determined for distributed content. Upon receiving a request for content from the content viewing client, the requested content can be distributed in a directional format consistent with the specified preference of the content viewing client. Specifically, where the preferred directional orientation differs from the native orientation of the requested content, the requested content can be transcoded to rearrange not only the textual portions of the requested content, but also positioning of frames within the content. In this way, one need not store separate versions of the same content to accommodate different preferred directional orientations.

7 Claims, 3 Drawing Sheets

OTHER PUBLICATIONS

Broadhead, Using HTML Frames for Institutional Websites, ACM 1998, pp. 278-285.*

Takahashi et al., A General Framework for Bi-Directional Translation between Abstract and Pictorial Data, ACM 1991, pp. 165-174.*

Tayli et al., Building Bilingual Microcomputer Systems, ACM May 1990, pp. 495-504.*

L.E. Palmer, *Typewriter With Reversible Writing Line, IBM Technical Disclosure Bulletin,* vol. 14, No. 4, (Sep. 1971).

M. S. Kaplan, *Internationalization With Visual Basic,* Chap. 4, pps. 102-105, and Chap. 10, pps. 331-332.

L. Lemay, *HTML Coding, Tricks With Tables, Web Techniques,* <http://www.newarchitectmag.com/print/documentsID=23515>, (Oct. 1996).

* cited by examiner

FRAME REARRANGEMENT TO SUPPORT BIDIRECTIONAL LANGUAGES IN A WEB APPLICATION

BACKGROUND OF THE INVENTION

1. Statement of the Technical Field

The present invention relates to the field of markup language processing, and more particularly to the processing of frames in markup language.

2. Description of the Related Art

Conventional markup can be visually presented through use of a content browser. Content browsers process display attributes embedded in markup to properly format content also contained within the markup. Notable variants of the content browser include the venerable Web browser, as well as the more recent extensible markup language (XML) browser. Regardless of the type of browser, all conventional markup processors are preconfigured to parse and interpret attribute tags embedded in markup. Examples of attribute tags include the well-known hypertext markup language (HTML) tags, <HEAD>, <BODY>, <H1>, <P>, <HREF>, <HTML> and <FRAMESET>.

In regard specifically to the <FRAMESET> attribute tag defining a set of displayable frames, many content distributors have incorporated frames in the design of Web pages, as frames allow Web sites to organize the presentation of disparate information in a logical and unified manner. Often, the enablement of multiple, scrollable regions of a single Web page forms the basis for the use of frames within the Web page. For example, it is known to use one frame to present a menu, while a second, adjacent frame can display the content associated with a particular menu choice. As another example, the results of a query can be presented in a first, scrollable frame, while the content associated with a particular result can be presented in an adjacent frame.

While frames can provide the benefit of screen organization and scrolling, frames can pose some difficulty in the support of bidirectional environments. Bidirectional environments relate to the directional manner in which information can be presented in an electronic document. Specifically, western languages such as English present information visually from left to right. In contrast, middle-eastern languages such as Hebrew and Arabic present information visually from right to left. In the course of undertaking internationalizing the presentation interface of computer software, solutions have been proposed which address the problem of bidirectional text. For instance, in one solution, text can be rearranged in a display window according to the underlying language associated with the character codes of each word in the text.

Other internationalization solutions address not only the underlying directional orientation of text, but also the arrangement of user interface controls in a graphical user interface. For example, in Kaplan, Internationalization with Visual Basic, (SAMS 199x), check boxes, labels, option buttons and text boxes can be horizontally "flipped" in terms of orientation to accommodate a bidirectional environment. The particular user interface control elements which can be flipped in the Kaplan reference, however, are flipped inasmuch as those control elements usually accompany text—hence the need to re-orient the control. By comparison, the teachings of Kaplan explicitly inhibit the re-orientation of other user interface controls such as combo boxes, command buttons, scroll bars, list boxes, picture boxes and, most importantly, frames.

While the use of frames in a conventional GUI as described in the Kaplan reference rightfully inhibits the re-orientation of frame elements because frames play little role in the GUI of a stand-alone application, the same cannot be said of an application whose interface relies upon the presentation attributes of a markup language. Specifically, frames play a crucial role in the presentation interface of a markup language defined user interface. Thus, in the context of markup, the directional implication of a language is not merely limited to the characters which form a word, or the words which form a sentence. Rather, the directional implication of a language can include the layout of the frames within the document itself. More particularly, in a right to left orientation, it can be preferable to horizontally re-orient adjacent frames in a content browser to accommodate a right-to-left environment.

Unfortunately, existing content browsers and markup languages do not account for bidirectional documents. In fact, in the HTML specification, while the "dir" attribute can specify a directional orientation, including "rtl" and "ltr"—right to left and left to right, respectively—the HTML specification cannot account for a document whose orientation can vary from right to left and left to right. Rather, to accommodate the bidirectional circumstance, separate markup must be maintained for both cases of left to right and right to left configurations. As one skilled in the art will recognize, however, maintaining two sets of markup to support the presentation the same content in different directional orientations requires the maintenance and synchronization of both sets of markup—a distinctly undesirable solution.

SUMMARY OF THE INVENTION

The present invention is a method, system and apparatus for supporting bidirectionally encoded content in a content distribution system. In accordance with the present invention, a bidirectional frame processor can be disposed in the content distribution system and can be tasked with the transformation of bidirectionally encoded content into content having a specific directional orientation according to the preferences of a requesting client. In one aspect of the present invention, the bidirectional frame processor can include a default directional orientation; and, a transcoding engine configured to respond to a request for content having a specified directional orientation.

In particular, the default directional orientation can include a directional orientation selected from the group consisting of right to left and left to right. In any case, the transcoding engine can respond to the request for content by encoding the requested content with the specified directional orientation. Moreover, where the specified directional orientation is opposite to the default directional orientation, the transcoding engine can reverse the ordering of each set of columns defined by each frameset encountered in the requested content. Additionally, the transcoding engine can reverse the ordering of each set of frames defined within each frameset.

Notably, the bidirectional frame processor can be disposed within the content distribution system specifically to support the internationalization of an application in the content distribution system. In that regard, bidirectionally oriented content can be specifically oriented to support a preferred language of presentation, such as English, French, German, Hebrew, Arabic, and the like. In accordance with this particular aspect of the inventive arrangements, a list of individual supported languages and associated directional orientations can be provided. Also, a comparator can be configured to match at least one of the supported languages with a language enumerated in a list of preferred languages, the matched one of the supported languages providing the specified directional orientation.

A method of processing bidirectionally encoded content for service in a content distribution system can include receiving a request for content having a specific directional orientation. A bidirectionally formatted version of the requested content can be retrieved and at least one set of frames can be located in the bidirectionally formatted version of the requested content, the frames in each set having a specified ordering. Finally, the bidirectionally formatted version can be transcoded into a directionally specific version of the requested content. Specifically, for each identified set of frames, the specified ordering of the frames can be reversed. Furthermore, the directionally specific version can be encoded with an attribute corresponding to the specific directional orientation.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a bidirectional frame processing system, method and apparatus. In accordance with the inventive arrangements, a preferred directional orientation can be determined, either directly or by inference where a content viewing client specifies a particular language of the distributed content. Upon receiving a request for content from the content viewing client, the requested content can be distributed in a directional format consistent with the determined preference. Specifically, where the determined directional orientation differs from the native orientation of the requested content, the requested content can be transcoded to rearrange not only the textual portions of the requested content, but also positioning of frames within the content. In this way, one need not store separate versions of the same content to accommodate different preferred directional orientations.

Figure 1:
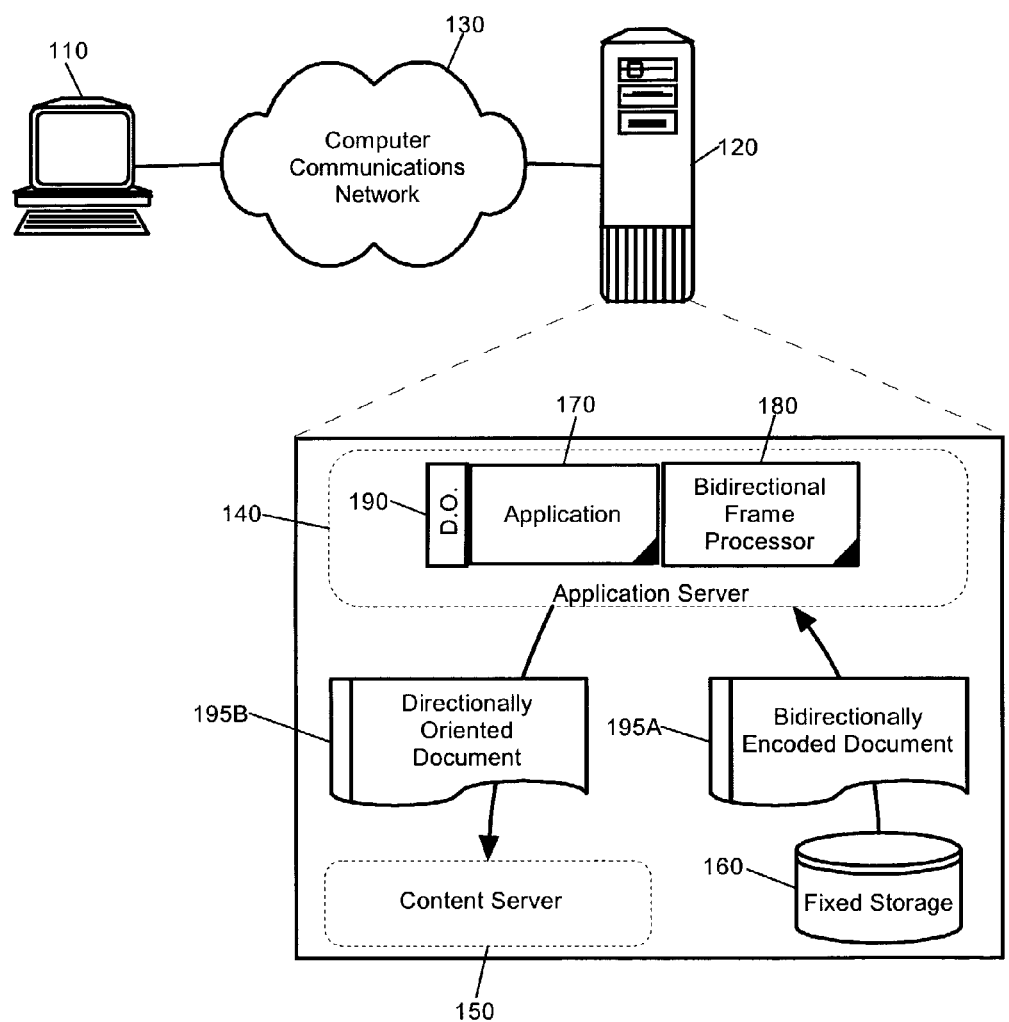
FIG. 1 is a block diagram illustrating a content distribution system which has been configured with a bidirectional frame processor in accordance with the inventive arrangements.

FIG. 1 is a block diagram illustrating a content distribution system which has been configured with a bidirectional frame processor in accordance with the inventive arrangements. The content distribution system can include a server device 120 communicatively coupled to a content processing client 110 over a computer communications network 130. The server device 120 can be either one computing device, or a set of computing devices, which collectively can process requests for content by locating, generating, retrieving, formatting and distributing content in the form of markup to requesting clients.

The content processing client 110, by comparison, can include one or more computing processes which can request and process content. Examples include receiving content in the form of markup and presenting the received content, either audibly or visually to a content consumer. Other examples include receiving content in the form of markup and further subjecting the received content to additional computing processes.

To facilitate the processing of requests for content received over the computer communications network 130, the server device 120 can include a content server 150 which has been configured to locate and retrieve requested content from fixed storage 160, and subsequently to forward the retrieved content to the requesting content processing client 110. The content server 150 also can be configured to forward specific processing requests received over the computer communications network 130 to processes operating in coordination with an application server 140. Specifically, the application server 140 can host one or more applications 170 which can be coded to handle any number or variety of computing tasks. Application servers are well-known in the art and include, for example, the Websphere® Application Server manufactured by International Business Machines Corporation of Armonk, N.Y., United States.

In accordance with the inventive arrangements, a bidirectional frame processor 180 can be communicatively coupled to one or more applications 170 in the application server 140. In that regard, the bidirectional frame processor 180 can retrieve requested content 195A from fixed storage 160 and can transcode the requested content 195A from a bidirectional orientation to a directional orientation, the transcoding process producing a directionally oriented document 195B. More particularly, based upon a specified preference 190 for one of a directional orientation or a presentation format associated with a specific directional orientation, the bidirectional frame processor can modify the ordering of the presentation of a set of frames in the bidirectionally encoded document so as to accommodate the preference 190 for a directional orientation which differs from that orientation specified in the bidirectionally encoded document.

Figure 2:
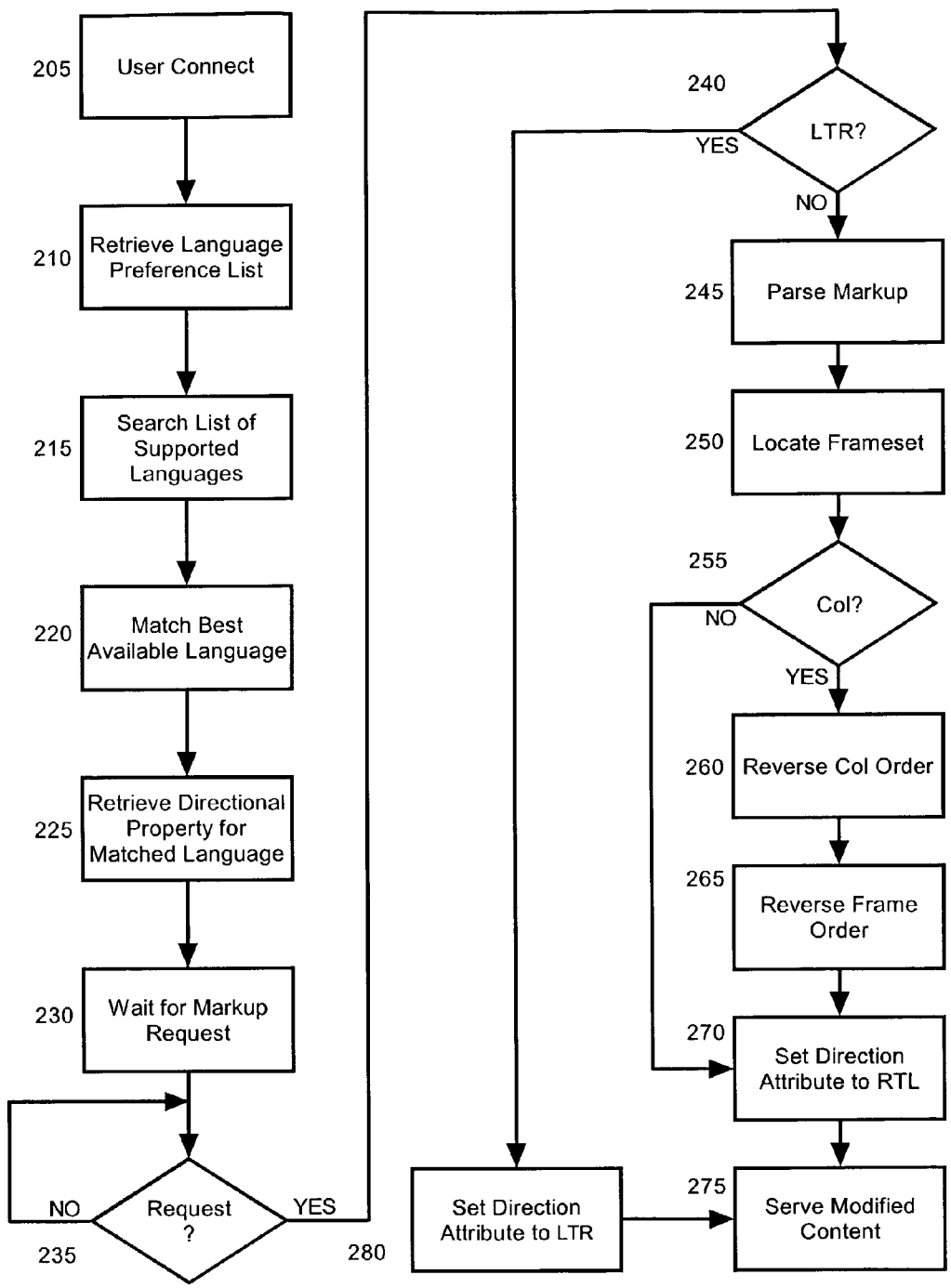
FIG. 2 is a flow chart illustrating a process for transcoding markup to support the bidirectional frame processing of the present invention; and, FIG. 3 is a pictorial illustration of the process for transcoding markup illustrated in FIG. 2.

As one skilled in the art will recognize, the invention can have particular application in supporting the internationalization of a network application. In that regard, FIG. 2 is a flow chart illustrating a process for transcoding content to support bidirectional frame processing in an internationalized network application. Beginning in block 205, a requesting client can connect to the network application over the computer communications network. In block 210, in the course of the connection, the requesting client can specify one or more preferred languages in a list. In block 215, the network application can parse the list and in block 220, the listed language which is best supported by the network application can be selected.

Each supported language can have associated therewith a directional orientation, for example right to left, or left to right. In block 225, the directional orientation of the selected language can be determined. Subsequently, in blocks 230 and 235, the network application can await a request to retrieve content in the ordinary course of operations of the network application. Once a request has been received, in decision block 240 it can be determined whether the selected language has a left to right, or a right to left orientation. If the selected language has a left to right orientation, presuming that the requested content has a default orientation of left to right, in block 280, the direction attribute of the requested content merely must be modified to indicate definitively, the left to right orientation of the requested content.

If in decision block 240, however, it can be determined that the selected language has a right to left orientation which runs counter to the default orientation of the requested content, in block 245 the content can be parsed and in block 250, a portion of the content defining a frameset can be located. In block 255, to the extent that the attributes which define the frameset also specify the partitioning of a presentation interface into discrete partitions, in block 260, the order of the partitions can be reversed. For example, where the frameset attribute defines a set of columns having different column widths in a visual presentation interface, the presentation order of the defined columns can be reversed.

In block 265, the order of the frames specified within the frameset can be reversed so as to cause the presentation of the frames to occur in reverse order. To ensure that any textual content presented exclusive of the frameset or within the frameset, also, has a reversed directional orientation, in block 270 the direction attribute of the requested content can be transcoded to reference a right to left orientation. Finally, in block 275, the modified content can be served to the requesting client.

Importantly, though the process illustrated in FIG. 2 relates exclusively to the reversal of a left to right orientation to a right to left orientation, the invention is not so limited. Rather, where the default orientation of a bidirectional document reflects a right to left orientation, the process flow depicted in FIG. 2 can be analogously applied to produce content having an explicit left to right orientation. Additionally it is to be noted that although the flow chart of FIG. 2 relates to the location and transcoding of a single frameset, it is contemplated that the invention can transcode multiple framesets within requested content in a similar manner, each frameset experiencing the transcoding process illustrated in blocks 250 through 265.

Finally, in accordance with a preferred aspect of the inventive arrangements, the invention can process not only multiple framesets with requested content as described in FIG. 2, but also the invention can process nested framesets to a level limited only by the underlying computing resources upon which the process can rely. Specifically, in the preferred aspect of the invention, as each frameset is identified for processing, it can be determined whether one or more framesets are included within the identified frameset. When it can be determined that one or more framesets have been embedded in the identified frameset, the process of reversing the directional orientation of the frames, columns and content within the nested frameset can be undertaken in the same manner as shown in FIG. 2.

Where additional framesets are identified within the nested framesets, the directional reversing process can be applied as well. The process can repeat for other remaining nested framesets at the same nesting level, and additionally for framesets which have nested within the nested framesets, and so forth. Importantly, one skilled in the art will recognize that the process of handling nested framesets in the present invention can be implemented either recursively or sequentially. In either case, the directional reversing process of the present invention can be applied for each level of nested framesets until no framesets remain.

Figure 3:
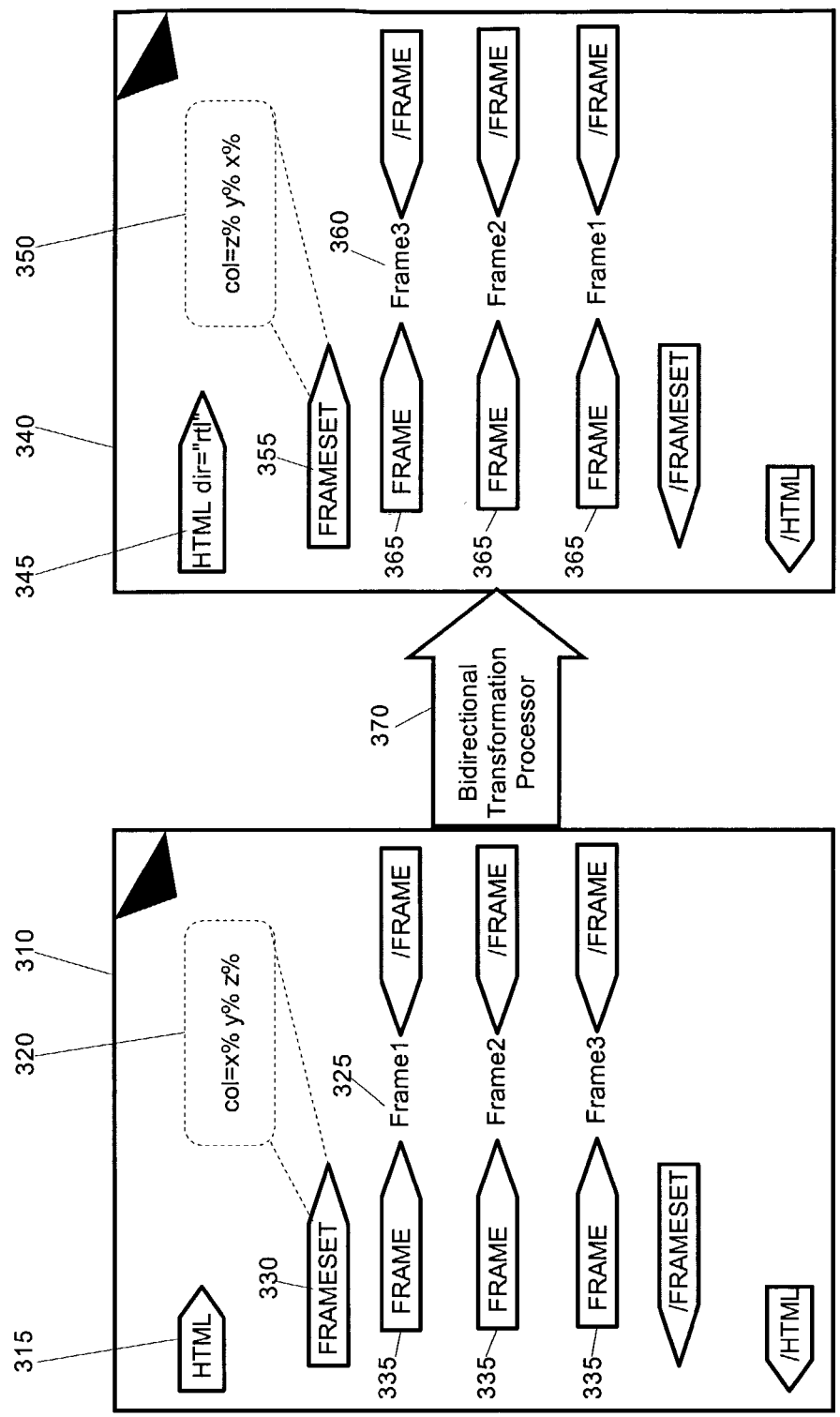

FIG. 3 is a pictorial illustration of the process for transcoding HTML formatted content in accordance with the process illustrated in FIG. 2. Specifically, in the case of HTML, bidirectional content 310 can be defined by an HTML tag 315. In accordance with the method of the invention, the HTML tag 315 and at least one frameset tag 330 can be located, the frameset defined by the frameset tag 330 including the specification of at least two frames 325 according to frame tags 335. Notably, the frameset tag can specify a number of columns 320 and their widths. To transform the bidirectional content 310 into directionally oriented content 340, a bidirectional transformation processor 370 can be applied.

Specifically, the bidirectional transformation processor 370 can transcode the bidirectional content 310 into directionally oriented content 340. For example, the ordering of the columns specified in the original frameset tag 330 of the bidirectional content can be reversed as shown in the transcoded frameset tag 355 having a reverse ordered column specifier 350. Additionally, the ordering of the frames 325 defined by the frame tags 335 can be reversed to produce a reverse ordered set of frames 360 defined by a reverse ordered set of frame tags 365. Finally, the HTML tag 315, itself, can be modified to produce the transcoded HTML tag 345 which defines with specificity, the directional orientation of the transcoded content as "right to left".

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. In a content distribution system, a bidirectional frame processor comprising:
   a default directional orientation;
   a list of supported languages and associated directional orientations;
   a comparator configured to match at least one of said supported languages with a language enumerated in a list of preferred languages, said matched one of said supported languages providing said specified directional orientations; and
   a transcoding engine configured to respond to a request for content having a specified directional orientation by:
   encoding said requested content with said specified directional orientation; and, where said specified directional orientation is opposite to said default directional orientation, reversing the ordering of each set of columns defined by each frameset encountered in said requested content, and reversing the ordering of each set of frames defined within each said encountered frameset.

2. A method of processing bidirectionally encoded content for service in a content distribution system, the method comprising the steps of:
receiving a request for content having a specific directional orientation;
retrieving a bidirectionally formatted version of said requested content;
locating a set of frames in said bidirectionally formatted version of said requested content, said set of frames having a specified ordering, wherein said locating step comprises the step of locating a frameset in said bidirectionally formatted version of said requested content, said frameset defining a set of frames, said set of frames having a specified ordering, wherein said locating step further comprises the step of identifying at least one nested frameset within said located frameset, said at least one identified nested frameset defining at least one of a set of frames; and,
transcoding said bidirectionally formatted version into a directionally specific version of said requested content, said transcoding step comprising the steps of, encoding said directionally specific version with an attribute corresponding to said specific directional orientation, and where said set of frames have been organized in a sequence of columns, reversing said sequence of columns and specified ordering of said set of frames,
wherein said transcoding step further comprises the step of, for each set of frames in said at least one identified nested frameset which have been organized in a sequence of columns, reversing said sequence of columns and specified ordering of said set of frames.

3. A method of processing bidirectionally encoded content for service in a content distribution system, the method comprising the steps of:
receiving a request for content having a specific directional orientation;
retrieving a bidirectionally formatted version of said requested content;
locating a set of frames in said bidirectionally formatted version of said requested content, said set of frames having a specified ordering, wherein said locating step comprises the step of locating a frameset in said bidirectionally formatted version of said requested content, said frameset defining a set of frames, said set of frames having a specified ordering, wherein said locating step further comprises the step of identifying at least one nested frameset within said located frameset, said at least one identified nested frameset defining at least one of a set of frames; and,
transcoding said bidirectionally formatted version into a directionally specific version of said requested content, said transcoding step comprising the steps of, encoding said directionally specific version with an attribute corresponding to said specific directional orientation, and where said set of frames have been organized in a sequence of columns, reversing said sequence of columns and specified ordering of said set of frames;
locating other nested framesets within a hierarchy of nested framesets; and,
where frames in said nested framesets in said hierarchy have been organized in a sequence of columns, reversing said sequence of columns of said frames in said hierarchy and reversing an ordering of frames in each nested frameset which has been organized in a sequence of columns.

4. A method of processing bidirectionally encoded content for service in a content distribution system, the method comprising the steps of:
receiving a request for content having a specific directional orientation;
retrieving a bidirectionally formatted version of said requested content;
locating a set of frames in said bidirectionally formatted version of said requested content, said set of frames having a specified ordering;
transcoding said bidirectionally formatted version into a directionally specific version of said requested content, said transcoding step comprising the steps of, encoding said directionally specific version with an attribute corresponding to said specific directional orientation, and where said set of frames have been organized in a sequence of columns, reversing said sequence of columns and specified ordering of said set of frames;
retrieving a list of preferred languages, each language in said list corresponding to a specific directional orientation;
comparing said retrieved list to a set of supported languages, each said supported language corresponding to a specific directional orientation;
identifying at least one matching supported language; and,
providing said specific directional orientation in said receiving step according to said matching supported language.

5. A machine readable storage having stored thereon a computer program for processing bidirectionally encoded content for service in a content distribution system, said computer program having a routine set of instructions which when executed cause the machine to perform the steps of:
receiving a request for content having a specific directional orientation;
retrieving a bidirectionally formatted version of said requested content;
locating a set of frames in said bidirectionally formatted version of said requested content, said set of frames having a specified ordering, wherein said locating step comprises the step of locating a frameset in said bidirectionally formatted version of said requested content, said frameset defining a set of frames, said set of frames having a specified ordering, wherein said locating step further comprises the step of identifying at least one nested frameset within said located frameset, said at least one identified nested frameset defining at least one of a set of frames; and,
transcoding said bidirectionally formatted version into a directionally specific version of said requested content, said transcoding step comprising the steps of, encoding said directionally specific version with an attribute corresponding to said specific directional orientation, and where said set of frames have been organized in a sequence of columns, reversing said sequence of columns and specified ordering of said set of frames,
wherein said transcoding step further comprises the step of, for each set of frames in said at least one identified nested frameset which have been organized in a sequence of columns, reversing said sequence of columns and specified ordering of said set of frames.

6. A machine readable storage having stored thereon a computer program for processing bidirectionally encoded content for service in a content distribution system, said computer program having a routine set of instructions which when executed cause the machine to perform the steps of:
- receiving a request for content having a specific directional orientation;
- retrieving a bidirectionally formatted version of said requested content;
- locating a set of frames in said bidirectionally formatted version of said requested content, said set of frames having a specified ordering, wherein said locating step comprises the step of locating a frameset in said bidirectionally formatted version of said requested content, said frameset defining a set of frames, said set of frames having a specified ordering, wherein said locating step further comprises the step of identifying at least one nested frameset within said located frameset, said at least one identified nested frameset defining at least one of a set of frames; and,
- transcoding said bidirectionally formatted version into a directionally specific version of said requested content, said transcoding step comprising the steps of, encoding said directionally specific version with an attribute corresponding to said specific directional orientation, and where said set of frames have been organized in a sequence of columns, reversing said sequence of columns and specified ordering of said set of frames;
- locating other nested framesets within a hierarchy of nested framesets; and,
- where frames in said nested framesets in said hierarchy have been organized in a sequence of columns, reversing said sequence of columns of said frames in said hierarchy and reversing an ordering of frames in each nested frameset which has been organized in a sequence of columns.

7. A machine readable storage having stored thereon a computer program for processing bidirectionally encoded content for service in a content distribution system, said computer program having a routine set of instructions which when executed cause the machine to perform the steps of:
- receiving a request for content having a specific directional orientation;
- retrieving a bidirectionally formatted version of said requested content;
- locating a set of frames in said bidirectionally formatted version of said requested content, said set of frames having a specified ordering;
- transcoding said bidirectionally formatted version into a directionally specific version of said requested content, said transcoding step comprising the steps of, encoding said directionally specific version with an attribute corresponding to said specific directional orientation, and where said set of frames have been organized in a sequence of columns, reversing said sequence of columns and specified ordering of said set of frames;
- retrieving a list of preferred languages, each language in said list corresponding to a specific directional orientation;
- comparing said retrieved list to a set of supported languages, each said supported language corresponding to a specific directional orientation;
- identifying at least one matching supported language; and,
- providing said specific directional orientation in said receiving step according to said matching supported language.

* * * * *